United States Patent
Bahr et al.

(10) Patent No.: US 11,090,844 B2
(45) Date of Patent: Aug. 17, 2021

(54) METHOD AND APPARATUS FOR PRODUCING A MOLDED COMPONENT

(71) Applicants: OLBRICH GmbH, Bocholt (DE); Johann Borgers GmbH, Bocholt (DE)

(72) Inventors: Manfred Bahr, Vreden (DE); Albert Van Der Linde, Bocholt (DE); Dieter Schnoklake, Bocholt (DE); Michael Ernst, Bocholt (DE); Michael Knuf, Isselburg (DE)

(73) Assignees: OLBRICH GmbH, Bocholt (DE); Johann Borgers GmbH, Bocholt (DE)

( * ) Notice: Subject to any disclaimer, the term of this patent is extended or adjusted under 35 U.S.C. 154(b) by 562 days.

(21) Appl. No.: 15/869,388

(22) Filed: Jan. 12, 2018

(65) Prior Publication Data

US 2018/0200925 A1    Jul. 19, 2018

(30) Foreign Application Priority Data

Jan. 13, 2017   (DE) .................... 20 2017 100 177.6

(51) Int. Cl.
   B29C 43/40   (2006.01)
   B29C 43/00   (2006.01)
   (Continued)

(52) U.S. Cl.
   CPC ............ B29C 43/40 (2013.01); B29C 43/003 (2013.01); B29C 43/52 (2013.01); *B29C 43/02* (2013.01);
   (Continued)

(58) Field of Classification Search
   CPC ....... B29C 43/40; B29C 43/003; B29C 43/52; B29C 43/02; B29C 43/58;
   (Continued)

(56) References Cited

U.S. PATENT DOCUMENTS 9,044,906 B2 *   6/2015   Theinert ................. B29B 11/16
9,393,743 B2 *   7/2016   Kraemer ................. B29C 70/48
(Continued)

FOREIGN PATENT DOCUMENTS

DE   102005029729   12/2006
DE   202013006307   7/2013
(Continued)

*Primary Examiner* — Matthew J Daniels
*Assistant Examiner* — Shibin Liang
(74) *Attorney, Agent, or Firm* — W. F. Fasse (57) ABSTRACT

A molded component is produced by heating a non-woven material web to bring it into a plastically deformable state, and then plastically deforming the non-woven material under pressure between two mold tools of a molding apparatus. The mold tools define therebetween at least one or preferably several mold cavities that respectively simultaneously form molded products therein. A cut is formed in the plastically deformable non-woven material web, preferably between two adjacent mold cavities, immediately before and/or during the molding step. The cut facilitates a pulling or flowing of the non-woven material away from the cut and toward a respective mold cavity to facilitate the molding deformation thereof while avoiding excessive stretching and thinning of the non-woven material, especially at the transition area between adjacent mold cavities.

21 Claims, 5 Drawing Sheets (51) Int. Cl.
*B29C 43/52* (2006.01)
*B29C 43/02* (2006.01)
*B29C 43/58* (2006.01)
*B29L 31/30* (2006.01)
*B29K 105/00* (2006.01)

(52) U.S. Cl.
CPC ...... *B29C 43/58* (2013.01); *B29C 2043/5833* (2013.01); *B29K 2105/256* (2013.01); *B29L 2031/3017* (2013.01)

(58) Field of Classification Search
CPC ...... B29C 2043/5833; B29K 2105/256; B29L 2031/3017
See application file for complete search history.

(56) References Cited

U.S. PATENT DOCUMENTS

| | | | |
|---|---|---|---|
| 2009/0230589 A1* | 9/2009 | Rossi | B29C 43/42 264/292 |
| 2010/0219561 A1 | 9/2010 | Pfaffelhuber et al. | |
| 2014/0302285 A1 | 10/2014 | Ikeji et al. | |
| 2016/0257455 A1* | 9/2016 | Kuruvilla | B29C 51/32 |

FOREIGN PATENT DOCUMENTS

| | | | |
|---|---|---|---|
| DE | 112012005205 | 9/2014 | |
| EP | 1 157 798 | 11/2001 | |
| JP | 2012125861 | * 12/2010 | ............... B26F 1/40 |

* cited by examiner

METHOD AND APPARATUS FOR PRODUCING A MOLDED COMPONENT

PRIORITY CLAIM

This application is based on and claims the foreign priority under 35 USC 119 of German Utility Model Application DE 20 2017 100 177.6 filed on Jan. 13, 2017, the complete disclosure of which is incorporated herein by reference.

FIELD OF THE INVENTION

The invention relates to a method and an apparatus for producing a molded component, especially or preferably of a non-woven material such as a fleece fabric. Generally, such a method and apparatus serves to heat, plastically deform and mold, and then cool and rigidify the non-woven material into a three-dimensionally molded shape between two mold halves or mold tools of a mold or forming apparatus.

BACKGROUND INFORMATION

Methods and apparatuses of the above mentioned general type for producing a molded component are known from the foreign patent documents DE 10 2005 029 729 A1, DE 20 2013 006 307 U1, DE 11 2012 005 205 T5, and EP 1 157 798 B1.

The fabrication and finishing of molded components based on non-woven materials such as fleece fabrics, for example covers or linings made of needle fleece or pile fleece materials or the like, come into play in the field of motor vehicle construction. In this context, such molded components of fleece materials are used to make vehicle interior finish and trim components, wheel well linings, and the like. In the interior areas of vehicles, such molded components especially serve a decorative function to provide a finished and pleasant appearance, while in the exterior areas of vehicles such molded components often serve for the mechanical protection of the vehicle undercarriage or body.

The non-woven materials, and particularly fleece fabric materials, used for such applications are typically based on synthetic fibers, for example polypropylene, polyethylene-terephthalate and the like. However, it is also known to use natural fibers such as wool, cotton, and other natural plant fibers, and/or organic or inorganic fiber goods such as glass fibers. Such various different types of fibers can also be used in combination with one another. Furthermore, a binder or matrix material, for example also in the form of fibers, or in the form of a powder or a dispersion, is mixed into the above mentioned fiber materials. The binder materials may be thermoplastic to melt or soften upon heating.

The molded components may be produced as finished parts or as semi-finished parts that need further fabrication steps to produce the final component to be installed. Such molded components formed of non-woven materials and particularly fleece fabric materials must be molded and formed to a specified three-dimensionally contoured shape and to specified dimensions, while maintaining tight tolerances. Furthermore, such an exact shape, dimensions and tolerances must be durably or permanently maintained by the molded component, even when it is subjected to high mechanical loads and the like. In this regard, it has been found to be disadvantageous that the molded components may suffer a material weakening, or especially incur thinned and thus weakened areas, during the molding process especially in areas where the non-woven material web undergoes a relatively strong change of its shape during the molding process. In such strongly molded areas, the non-woven material undergoes a stretching elongation during the molding process, which in turn leads to a thinning and thus a weakening of the material at such areas.

In that regard, the non-woven material web is especially strongly subjected to potential stretching, thinning and weakening at a transition area between adjacent mold cavities in a mold or forming apparatus with several mold cavities. The term mold cavity is understood to refer to a pair or set of a punch or stamp (convex tool) and a mating die (concave tool) that form a respective molded component therebetween. Particularly, a single mold or forming apparatus may include several mold cavities defined between an upper mold tool and a lower mold tool, in order to be able to produce several molded components simultaneously during a single molding cycle of the mold or forming apparatus. It has been found that the non-woven material web can often undergo particularly severe stretching and consequent thinning at such a transition area between two adjacent mold cavities because the material in this area is subjected to pulling and stretching from both adjacent mold cavities for performing the molding deformation of the non-woven material in the respective mold cavities. In order to enable a certain minimum amount of material after-flow of the non-woven material toward and/or into the adjacent mold cavities at such a transition area during the molding process, the spacing distance between the adjacent mold cavities in the mold tool has been correspondingly increased in order to provide enough of the non-woven material to allow the stretching and pulling of the material into both neighboring mold cavities. However, a disadvantage arises in that such increased spacing of the mold cavities from one another correspondingly increases the amount of non-woven material required for each mold cycle, and thus also correspondingly increases the amount of excess material that covers the enlarged transition area and ultimately remains unused. This increases the proportion of waste material, and thus correspondingly increases the cost of producing the molded components.

SUMMARY OF THE INVENTION

In view of the above, it is an object of at least one respective embodiment of the invention to provide a method and an apparatus of the above discussed general type, which has been further developed to produce molded components of non-woven material, such as fleece fabric materials, having high quality and especially a uniform material thickness, while also achieving a reduction of the total amount of material that is required. The invention further aims to avoid or overcome the disadvantages of the prior art, and to achieve additional advantages, as apparent from the present specification.

The above objects can be achieved by a method according to the invention, in which a non-woven material web is provided, heated to bring it into a plastically deformable condition, and then molded or formed under pressure in a mold or forming apparatus. The apparatus includes cooperating first and second mold halves or mold tools forming at least one mold cavity therebetween. After being formed or molded, the non-woven material is cooled in the mold so as to become at least partially solidified, rigidified or fixed in the molded contoured shape thereof. Further according to the invention, the method involves forming at least one cut in the plastically deformable non-woven material directly before and/or during the molding deformation thereof in the mold. Preferably the mold includes at least two adjacent mold cavities, and the cut is formed in the non-woven material at a transition area between two adjacent mold cavities of the mold. The non-woven material web preferably extends in a continuous one-piece manner between the two adjacent mold cavities. The cut allows the non-woven material to be pulled away from the cut and toward the adjacent mold cavities, while the cut is pulled open laterally, which facilitates the after-flow of the material toward and/or into the mold cavities to reduce the stretching and thinning of the material. The cut is preferably a penetrating through-cut, which may form a penetrating cut line, or a penetrating perforation line of plural spaced-apart perforations.

The above objects can further be achieved with an apparatus according to the invention that includes a mold or forming apparatus having cooperating first and second mold halves or mold tools that define at least one mold cavity therebetween. The apparatus further includes at least one cutting blade on at least one of the mold tools, adapted to form a cut in the non-woven material web directly before and/or during the molding deformation of the non-woven material web between the mold tools.

Forming the cut in the non-woven material web directly before and/or during the molding deformation of the non-woven material web allows the non-woven material to be pulled away from the cut and thus flow out of the transition area between two adjacent mold cavities and/or out of the rim area of a mold cavity of the molding tool, toward and/or into the respective mold cavity or cavities. Such pulling and stretching of the non-woven material into the mold cavity due to the molding deformation of the material in the mold cavity is called "after-flow" herein. By separating the non-woven material at the transition area between two adjacent mold cavities and/or in a rim area of a mold cavity, the penetrating cut according to the invention facilitates the after-flowing of the non-woven material away from the cut line toward and into the respective mold cavity or cavities. The after-flowing of the plastically deformable non-woven material web into the adjacent mold cavities of the mold can further be adjusted or regulated by adjusting or regulating the time sequencing and time spacing between the beginning and the end of the after-flowing into the adjacent mold cavities. This can be achieved by adjusting or regulating the protruding position of the cutting blade relative to (e.g. protruding in advance of or ahead of) the respective mold tool, e.g. mold punch or die.

BRIEF DESCRIPTION OF THE DRAWINGS

In order that the invention may be clearly understood, it will now be described in further detail in connection with example embodiments thereof, with reference to the accompanying drawings, wherein.

DETAILED DESCRIPTION OF EXAMPLE EMBODIMENTS OF THE INVENTION

Figure 1:
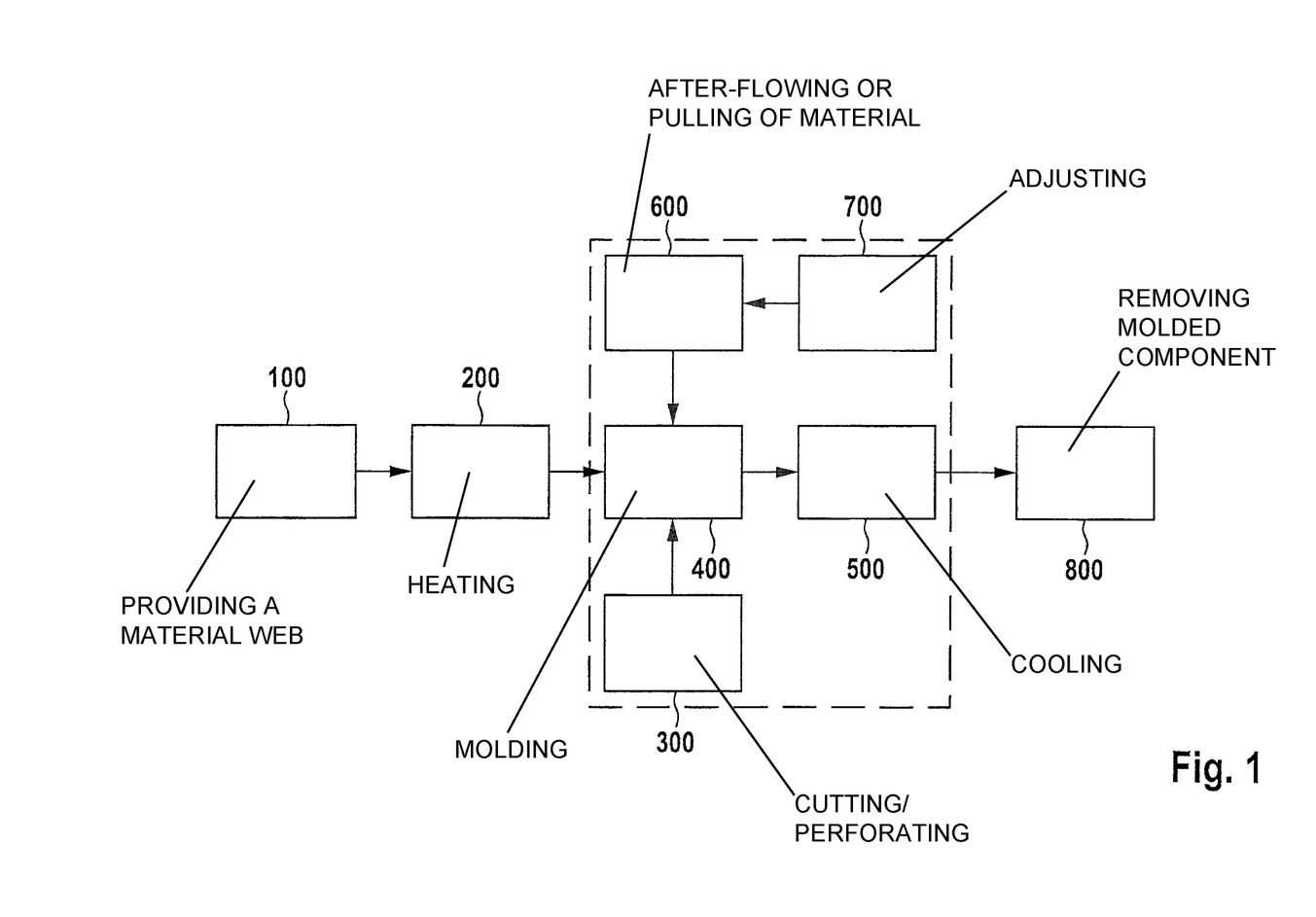
FIG. 1 is a schematic flow diagram of an embodiment of a method according to the invention.

The flow diagram of FIG. 1 illustrates an example embodiment of an inventive method for producing a molded component from a non-woven material such as a fleece fabric material, for example using a molding apparatus including a mold 2 according to an inventive embodiment as shown in FIGS. 2 to 5. The method begins with a step 100 of preparing or providing a non-woven material web 1 such as a fleece material web, which comprises or consists of a thermoplastic material. The non-woven material web may be any known type of non-woven material comprising any one or more of synthetic fibers, natural fibers, organic fibers, inorganic fibers, glass fibers, etc., in the form of a fleece material or other non-woven material. In a step 200, the non-woven material web is heated sufficiently to be brought into a plastically deformable condition, for example using any known heating device and method. Then in a step 400, the plastically deformable non-woven material web 1 is molded under pressure between two mold halves or mold tools 2.1 and 2.2 of a mold 2, whereby the non-woven material is stretched and plastically deformed to have a desired three-dimensionally molded contour in at least one mold cavity 3 between the two mold tools 2.1 and 2.2. The two mold tools can be cooled in any known manner, for example by cooling water provided via cooling water connections 7, so that in a step 500 after completion of the molding step 400, the molded component of the non-woven material is cooled and thereby solidified and rigidified to maintain the molded contoured configuration thereof.

In a step 300, at least one cut is formed or provided in the plastically deformable non-woven material web along a cut line 6, immediately before and/or during the molding step 400, especially during the time interval while the two mold tools 2.1 and 2.2 are moving or approaching closer to one another in the mold motion advance direction X but have not yet reached their closed end position relative to one another. Once the cut is formed, then the portion of the non-woven material web adjoining the cut edge 4 in the rim area of the respective mold cavity 3 of the mold tool can more easily flow or be pulled into the respective mold cavity 3 during the further process of the molding step 400, i.e. as the mold tools continue to move closer together during the remainder of the molding step 400 after the cutting step 300. This pulling or after-flowing of the non-woven material web toward and into the mold cavity 3 is represented in the step 600.

The cut formed during the step 300 is preferably at least one penetrating cut that penetrates entirely through the non-woven material web, but is only a partial cut in that it does not totally separate two portions of the material web from one another. The cut line 6 formed by the cut is preferably positioned between two adjacent mold cavities 3 of the mold tool 2.1, 2.2, between which the non-woven material web preferably continuously extends as one piece. This can also be seen in FIG. 4, which will be described further below. The cut line 6 may be a continuous penetrating line segment cut or a line of spaced-apart penetrating perforations.

According to a further optional step 700, the extent of the pulling or after-flowing of the non-woven material into the adjacent mold cavity 3 during the rest of the molding process 400 is adjusted or regulated. For example, the after-flowing or pulling of the plastically deformable non-woven material web into the adjacent mold cavity is regulated by appropriately regulating the time sequence or time spacing between the beginning and the end of performing the cutting step 300, especially relative to the timing sequence or the beginning and/or end of the molding step 400. In this regard, the adjusting step 700 may involve adjusting the spacing or protrusion distance by which the cutting blade 5, 5.1, 5.2, 5.3 for forming the cut line 6 protrudes (in the mold motion direction X) in advance beyond or before the mold tool 2.1, 2.2 on which the cutting blade is arranged. This correspondingly causes an adjustment of the time spacing between the beginning of the formation of the cut and the time point at which the molding is completed, at a prescribed advancing speed of the mold tools 2.1 and 2.2 relative to one another in the mold advance or motion direction X.

Figure 2:
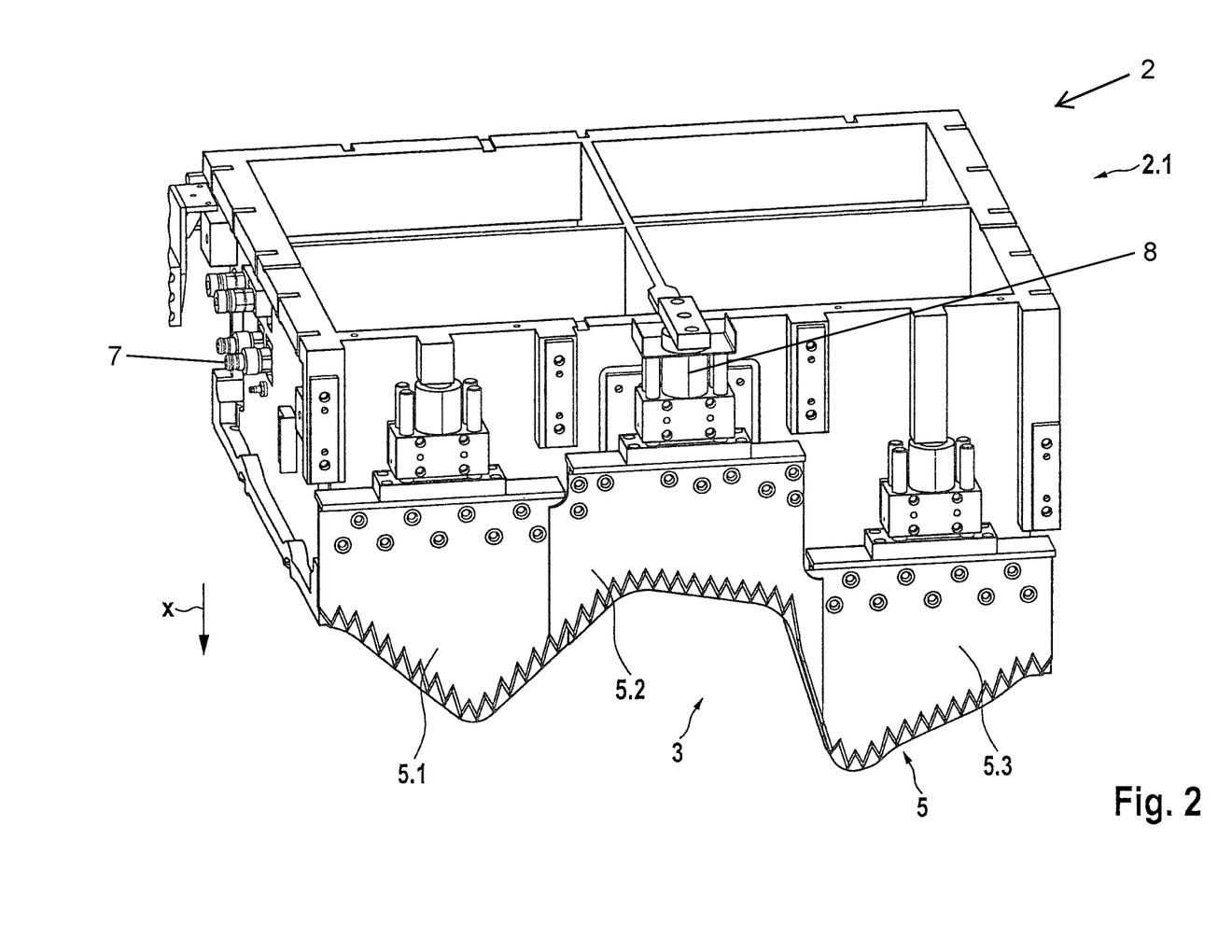
FIG. 2 is a schematic perspective illustration of an upper mold tool with a multi-part cutting blade, showing a first position of the central part of the blade, according to an embodiment of the apparatus of the invention.
Figure 3:
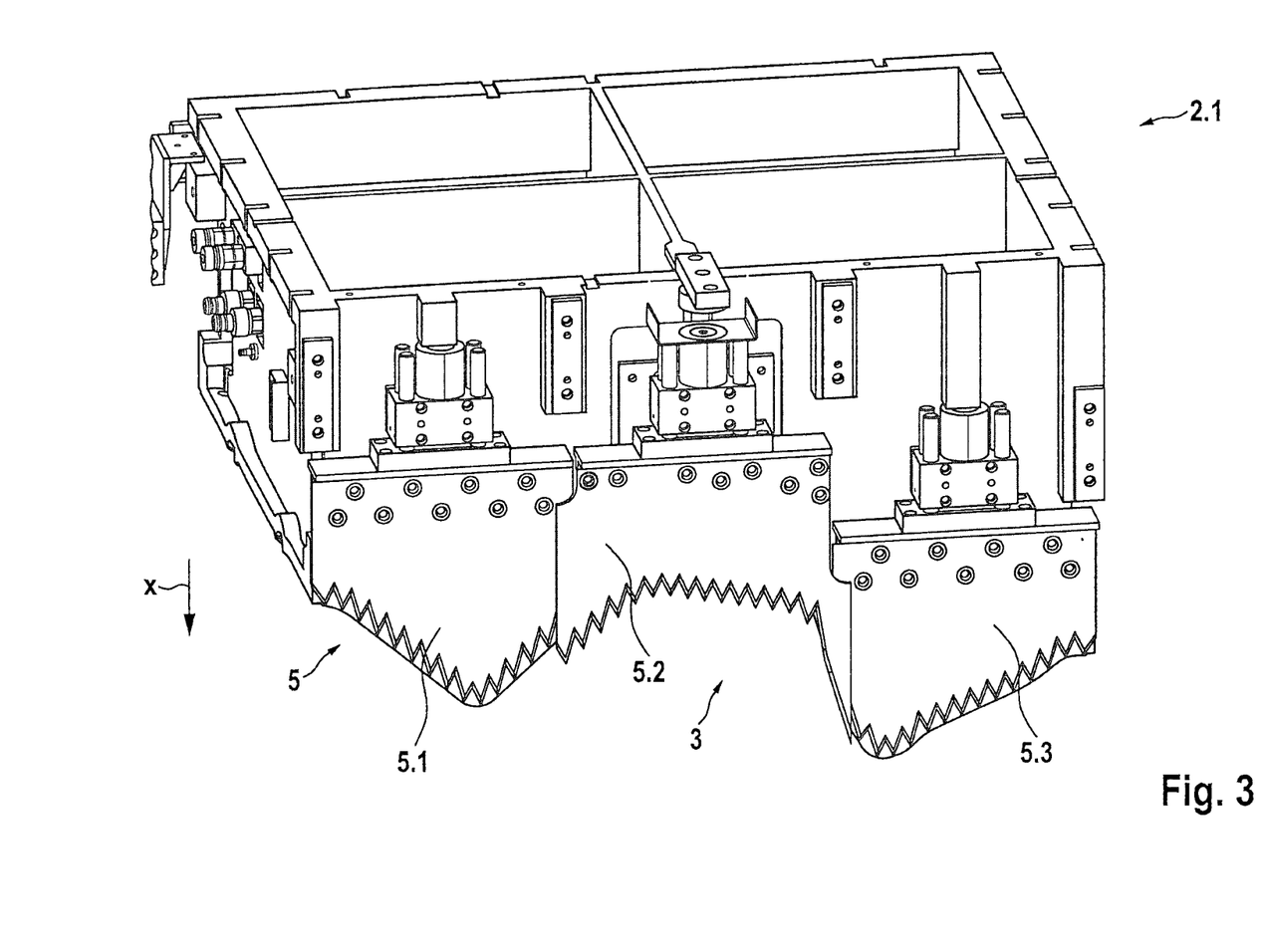
FIG. 3 is a schematic illustration similar to FIG. 2, but showing the central part of the cutting blade in a second position.

In this regard further, the actual extent of after-flowing of the non-woven material into the adjacent mold cavity during a prior molding cycle can be detected and compared with a prescribed nominal target value of the desired extent of the after-flowing, and the result of this comparison is used to control the protrusion distance of the cutting blade during a subsequent molding cycle. In this regard, first and second partial blades of the cutting blade can be moved or adjusted to different positions relative to one another in the mold advance direction X. For example, as shown in FIGS. 2 and 3, the second partial blade 5.2 can be adjusted to different positions in the mold advance direction X relative to the first partial blade 5.1 and the third partial blade 5.3 of the cutting blade 5. FIG. 2 shows a retracted position of the second partial blade 5.2, while FIG. 3 shows a further extended position of the second partial blade 5.2 relative to the first partial blade 5.1 and the third partial blade 5.3. The first and third partial blades are also independently adjustable as to their positions. Particularly, the cutting blade 5 or any individual one or ones of the partial blades 5.1, 5.2 and/or 5.3 are preferably positioned appropriately so that the penetrating cut can be formed in a single continuous cutting process step that begins immediately before the molding step 400 and continues and is completed during the molding step 400. Particularly, a first portion of the cut can be formed directly before the molding step, and a second portion of the cut can be formed during the molding step.

In the step 500, the molded component is cooled and thereby rigidified in the molded configuration thereof after the completion of the molding step 400. This can be achieved by cooling the mold tools 2.1 and/or 2.2, for example by supplying cooling water through cooling water connections 7.

The dashed line encompassing the steps 300, 400, 500, 600 and 700 in the flow diagram of FIG. 1 indicates that these steps can be performed essentially simultaneously or at least parallel and overlapping in time. However, certain individual steps or sub-steps among the method steps 300 to 700 in certain embodiments of the invention can be carried out offset in time from one another or offset in time relative to the remaining ones of the steps 300 to 700. Then according to the final step 800, the finished, molded, cooled and rigidified non-woven material molded component is removed from the molding tool. If necessary, the molded component (e.g. as a semi-finished component) can then be supplied to any desired further post-processing.

Features of an apparatus for performing the method are illustrated schematically in FIGS. 2 to 5, and will now be described further here with reference to those figures. FIG. 2 shows an example embodiment of a first mold half or mold tool 2.1 of the mold 2. The first mold tool 2.1 includes at least one mold cavity 3 (respectively comprising a mold die or a mold punch or stamp), and a cutting blade 5 arranged at an edge of a rim area of the mold cavity 3 or between adjacent mold cavities 3. The cutting blade 5 protrudes beyond or ahead of the mold tool 2.1 in the mold motion or advance direction X. The cutting blade 5 comprises three separate partial blades 5.1, 5.2 and 5.3 that are adjustable in the mold advance direction X relative to one another and relative to the mold tool 2.1. In FIG. 2, the second partial blade 5.2 is in a retracted position, while in FIG. 3 the second partial blade 5.2 has been moved to an extended or further protruding position in the mold advance direction X. The blades may each be moved independently by a respective cutting blade adjustment drive 8 of any known drive construction. Thus, as the two mold tools (of which only the upper mold tool 2.1 is shown) move toward one another in direction X during the molding step 400, the second partial blade 5.2 in its extended position of FIG. 3 will come into contact with, and form a cut in, the material web 1 earlier and thereby begin forming the penetrating cut line or perforation line through the material web beginning at an earlier time. The earlier the cutting blade 5 contacts the material web 1, the earlier the penetrating cut will be formed, which leaves more time during the molding process for the material web to be pulled or after-flow into the three-dimensional contoured shape of the mold cavity during the remainder of the molding process. As shown in FIGS. 2 and 3, the cutting blade 5 may have a serrated or zig-zag sawtooth cutting edge comprising individual cutting edge teeth or peaks that each respectively form one of the perforations of a perforated cut.

Figure 4:
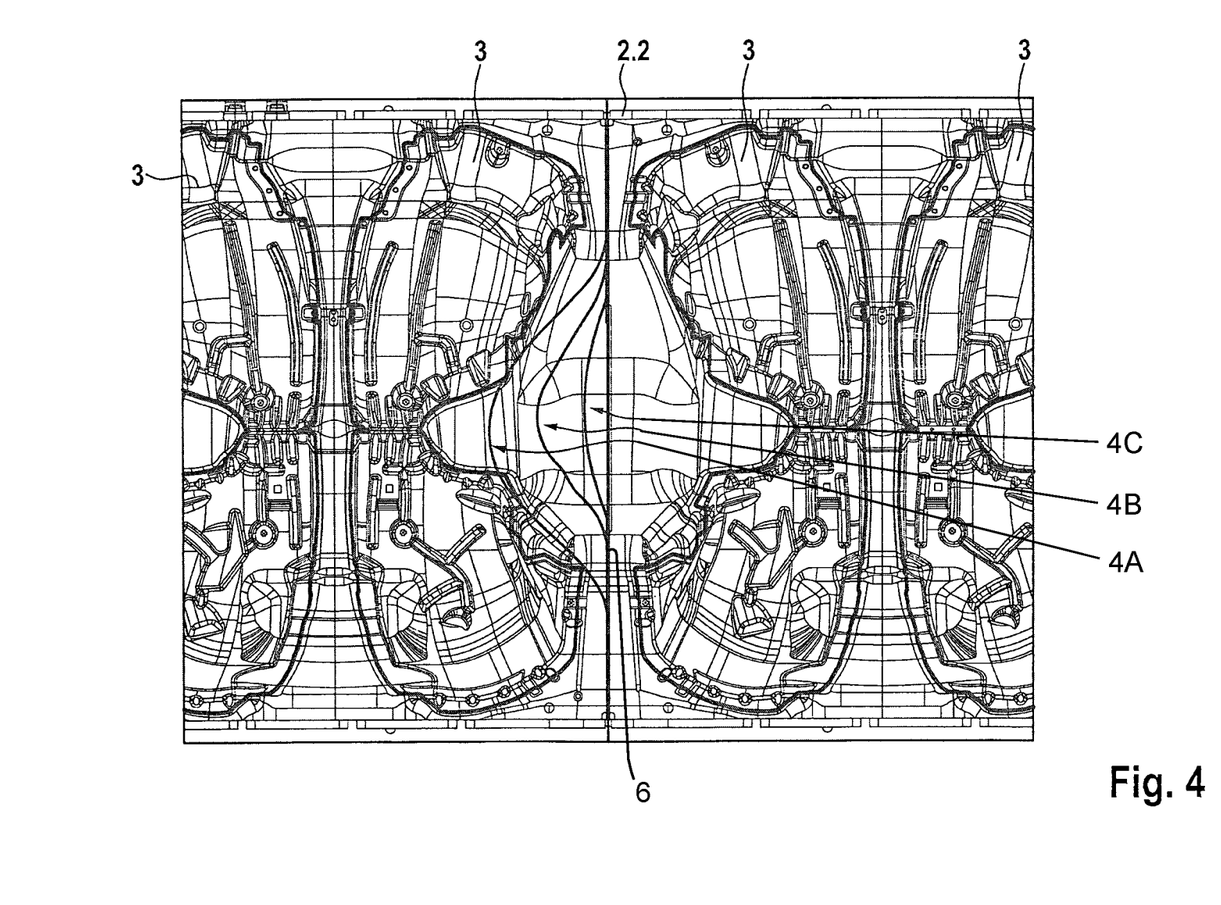
FIG. 4 is a schematic top plan view onto a lower mold tool having several mold cavities adjacent to one another, showing three different extents of the after-flowing of the non-woven material from the cut line toward an adjacent mold cavity dependent on the position of the cutting blade.

The top plan view of FIG. 4 shows the cut line 6 along which the perforated cut or the continuous cut is formed by the cutting blade 5. FIG. 4 also shows three different cut edge fronts or positions 4A, 4B, 4C of the cut edge 4 corresponding to four different adjusted positions of the cutting blade 5 in the direction X. Namely, the extent of the after-flowing or pulling of the cut non-woven material depends on how far the cutting blade or blades is or are adjusted in the mold advance direction X. Thus, the left cut edge front or position 4A shown in FIG. 4 occurs with the farthest advance position of the cutting blade, whereby the cut edge 4 is pulled to within the outer boundary of the mold cavity 3. This is problematic because the cut edge 4 has thus flowed into the mold cavity 3 so far that the produced molded component is incomplete, i.e. material is missing near the edge thereof, so that the molded component must be rejected as defective. In comparison, the right cut edge position 4C shows that the cut edge 4 has been pulled only slightly toward the mold cavity 3 so that a considerable amount of waste material remains as scrap beyond the edge of the mold cavity. The middle cut edge position 4B in FIG. 4 shows a reasonable extent of after-flowing or pulling of the non-woven material web toward the mold cavity during the molding process so as to minimize the waste, facilitate the after-pulling of the material toward the mold cavity, but avoid the cut edge from being pulled within the finished perimeter of the molded component in the mold cavity.

Figure 5:
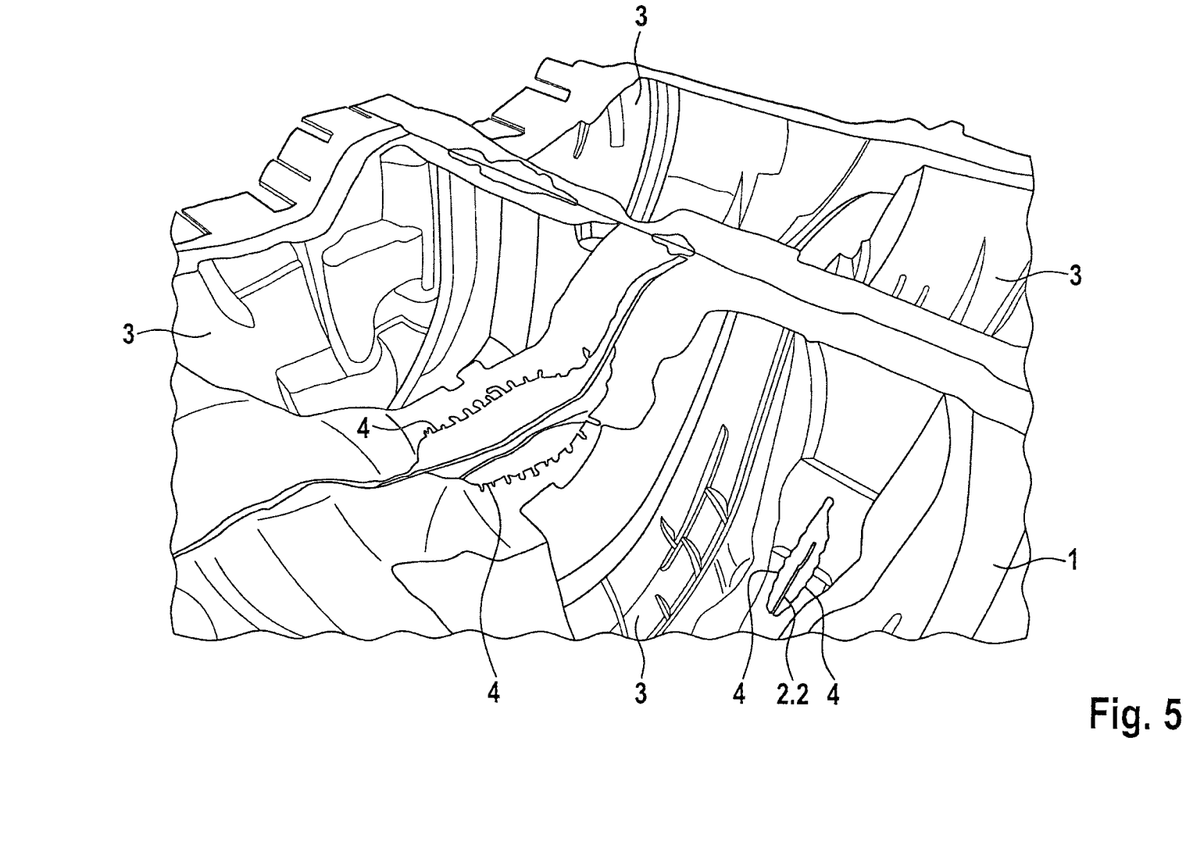
FIG. 5 is a schematic perspective illustration of a lower mold tool having several adjacent mold cavities with several molded components respectively formed therein.

FIG. 5 shows a non-woven material web 1 that extends over a second or lower mold tool 2.2 having several mold cavities 3. In the transition area between the two adjacent mold cavities 3 toward the front or lower left of the drawing of FIG. 5, a penetrating cut (as a continuous cut line segment or as a row of perforations) has been formed through the material web 1 in this area, as described above, so that the material web could more easily flow or be pulled into the adjacent mold cavities 3 at this transition area during the molding process. As a result, it can be seen that the cut has been pulled open in that the formed cut edges 4 have been pulled laterally apart from one another, for example to the cut edge position 4B represented in FIG. 4. As described above, the extent of the pulling of the cut edge toward the respective mold cavity can be adjusted by appropriately adjusting the position of one or more cutting blade portions in the mold advance direction.

In order to be able to further control the after-flowing or pulling of the plastically deformable non-woven material web during the molding process, a further optional step involves providing a wave cut or corrugated cut along the opposite outer edges of the non-woven material web, before performing the cutting step 300 and the molding step 400. Then, the non-woven material web is held and guided preferably under a pre-tension in a clamping and holding frame along at least two opposite sides or edges thereof. During the molding step, at least one holding frame can hold and guide the non-woven material web along at least two sides or edges thereof, and if applicable can be regulated or followingly adjusted in the pre-tension thereof, so that the after-flowing or pulling of the plastically deformable non-woven material web can be at least partially or proportionally compensated. The clamping and holding frame can comprise several clamps of which the respective holding force is adjustable independently of one another.

During the molding step, the after-flowing or pulling of the plastically deformable non-woven material web can be monitored with respect to at least one position, and a further after-flowing or pulling of the material web can be prevented or limited as required by a corresponding increase of the holding force of the clamping and holding frame.

For continuously improving the molding process it can be provided that in successive molding processes of plastically deformable non-woven material webs, the time or distance spacing at which the cutting is performed, preferably with an advancing cutting blade or partial blade, is automatically adjusted by means of an adjusting or regulating mechanism, e.g. comprising an electronic controller connected to the cutting blade adjustment drives 8, in the respective subsequent molding process based on the actual after-flowing or pulling of the non-woven material web that occurred in the preceding molding process, by comparing the actual detected after-flowing with a predefined nominal target value of the desired extent of after-flowing of the non-woven material. In such regulated after-adjusting of the cutting blades, first and second partial blades of the cutting blade can be adjusted relative to one another in the mold advance direction.

During the molding process, a holding force of a clamping and holding frame in which the plastically deformable non-woven material web is held can be selected and if applicable regulated or after-adjusted in such a manner so that a further tensioning that the non-woven material web experiences during the molding is at least partially or proportionally compensated by after-flowing or pulling of the plastically deformable non-woven material web. Thereby, the after-flowing of the non-woven material web can be monitored with sensors in connection with a position of a rim or edge, preferably an outer edge, of the non-woven material web, and a further after-flowing thereof can be prevented or limited by increasing the holding force of the clamping and holding frame.

If the plastically deformable non-woven material web has flowed or been pulled up to a permissible maximum value toward the adjacent mold cavity, then the non-woven material web can be fixed at its edge rim area relative to the corresponding molding tool edge area to prevent further pulling or flowing thereof, by pressing the edge area of the non-woven material web into a recess, particularly a groove, in one of the molding tools. Namely, respectively one of the mold tools can comprise a recess, particularly a groove, on a side thereof respectively facing the other mold tool, whereas the other mold tool may comprise a stamp or punching blade that aligns with the recess. By means of the stamp or punching blade, the non-woven material web can be pressed into the recess, in order to fix the non-woven material web with the recess relative to the molding tool, and thereby prevent a further after-flowing or pulling of the material web into the mold cavity of the respective mold tool.

The apparatus can further include a sensor arrangement that is configured, arranged and adapted to detect a position of an edge or rim area of the plastically deformable non-woven material web relative to the mold and particularly with respect to at least one of the two mold tools. The apparatus is further configured and adapted to monitor the pulling or after-flowing of the plastically deformable non-woven material web during the molding process by monitoring a position change or variation of at least one of the opposite edges of the non-woven material web, or by monitoring a position change or variation of a cut edge created by the penetrating cut, for example using one or more sensors of the sensor arrangement.

As explained above, a holding force of at least one clamp of the clamping and holding frame is adjustable. For that purpose, the apparatus can further comprise an adjusting and regulating mechanism that is configured and adapted to adjust or regulate the holding force dependent on a position of an edge of the non-woven material web with respect to the molding tool, whereby this position has been detected by the sensor arrangement. Particularly, this adjustment of the holding force can be increased correspondingly once the edge of the non-woven material web has reached a predefined nominal target end position thereof, so as to fix the non-woven material web in the clamping and holding frame. The clamping and holding frame preferably grasps the non-woven material web along the wave cut or corrugated cut, preferably exclusively on the protruding wave crests of the wave cut.

The mold halves or mold tools can be coolable in any known manner, so that the molded component can be cooled and therewith rigidified in the molded configuration thereof. The mold tools can also be permanently or continuously cooled so that the non-woven material is pre-cooled already during the molding step. Particularly, one or both of the mold tools can be coolable permanently i.e. continuously or in an intermittent time-limited manner in order to cool the molded component and thereby rigidify and fix it in the molded configuration thereof.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A method of forming a molded component, in a mold including two mold tools defining a mold cavity therebetween, wherein the method comprises the steps:

a) providing a material web that comprises a thermoplastic material;
b) heating the material web to a plastically deformable condition thereof;
c) while the material web is in the plastically deformable condition, molding a product portion of the material web under pressure into a molded configuration in the mold cavity between the two mold tools;
d) before and/or during the molding in the step c), forming a cut in a waste portion of the material web at a location offset outwardly away from a perimeter of the product portion of the material web, wherein the cut is a penetrating cut through a thickness of the waste portion of the material web, wherein the cut does not totally separate the product portion from the waste portion of the material web, and wherein the material web bordering the cut is pulled away from the cut and toward the mold cavity during and due to the molding in the step c), whereby at least one opening formed by the cut through the thickness of the material web is widened; and
e) cooling the material web in the molded configuration to thereby form the molded component from the product portion of the material web.

2. The method according to claim 1, wherein:
the mold cavity is a first mold cavity,
the two mold tools further define a second mold cavity therebetween,
the first and second mold cavities are adjacent to one another between the two mold tools,
the material web extends continuously as one piece over and between the first and second mold cavities, and
the cut is formed centrally between the first and second mold cavities in a transition area of the mold.

3. The method according to claim 1, wherein the cut is a continuous line segment cut along a cut line.

4. The method according to claim 1, wherein the cut is a discontinuous perforation cut comprising plural discrete spaced-apart perforations along a perforation line.

5. The method according to claim 1, wherein the cut is formed beginning before the molding in the step c).

6. The method according to claim 1, wherein the cut is formed at least partially during the molding in the step c).

7. The method according to claim 1, wherein the cut is formed in a single continuous cutting process that begins before and continues at least partly during the molding in the step c).

8. The method according to claim 1, wherein the cut includes first and second cut portions, and wherein the first cut portion is formed before the molding in the step c), and the second cut portion is formed during the molding in the step c).

9. The method according to claim 1, further comprising regulating an extent to which the material web is pulled away from the cut and toward the mold cavity by regulating a time sequencing or time spacing between a beginning and an ending of the forming of the cut and relative to an ending of the molding in the step c).

10. The method according to claim 1, wherein the cut is formed by a cutting blade adjustably arranged on a first one of the two mold tools, and further comprising regulating a time spacing between a beginning of the forming of the cut and an ending of the molding in the step c) by adjusting a position of the cutting blade relative to the first mold tool in a mold-closing advance direction.

11. The method according to claim 10,
further comprising:
detecting an extent to which the material web is pulled away from the cut and toward the mold cavity in a first molding cycle comprising the steps b) to e),
comparing the detected extent with a pre-defined nominal target value, and
performing the adjusting of the position of the cutting blade dependent on a result of the comparing, before a second molding cycle following the first molding cycle.

12. The method according to claim 11, wherein the first molding cycle is performed on a first piece of the material web, and the second molding cycle is performed on a second piece of the material web.

13. The method according to claim 1, wherein the forming of the cut in the step d) is performed after the heating in the step b).

14. The method according to claim 1, wherein the cut is formed in the material web by a cutting blade that is arranged on a first one of the two mold tools and that has a cutting edge thereof facing toward a second one of the two mold tools, the cutting blade includes first and second partial blades, and the method further comprises independently adjusting the first and second partial blades so that respective first and second cutting edges of the first and second partial blades are at different protrusion positions protruding forwardly from the first one of the mold tools in a direction of a motion carried out by the first one of the mold tools toward a second one of the mold tools for performing the molding.

15. The method according to claim 1, wherein the pulling of the material web away from the cut and toward the mold cavity during and due to the molding in the step c) reduces stretching and thinning of the material web in the mold cavity.

16. The method according to claim 1, wherein the pulling of the material web away from the cut and toward the mold cavity does not pull a cut edge of the cut to within a finished outer perimeter of the molded component in the mold cavity.

17. The method according to claim 1, further comprising:
holding and guiding the material web with a holding frame along opposite outer edges of the material web, during the molding of the material web in the step c), and
adjusting or regulating a tension applied by the holding frame onto the material web, so as to adjust or regulate an extent of the pulling of the material web away from the cut and toward the mold cavity.

18. The method according to claim 1, further comprising:
additionally forming a wave cut or a corrugated cut in the material web along opposite outer edges of the material web, before the molding of the material web in the step c); and
holding and guiding the material web with a holding frame along the opposite outer edges of the material web, during the molding of the material web in the step c).

19. The method according to claim 4, wherein the discontinuous perforation cut is formed by a cutting blade that has a serrated cutting edge comprising individual cutting edge teeth that each respectively form one of the discrete spaced-apart perforations along the perforation line in the waste portion of the material web.

20. The method according to claim 1, wherein the cut is formed in the waste portion of the material web by a cutting blade having a cutting edge that protrudes ahead of a first one of the two mold tools in a mold closing direction toward a second one of the two mold tools during a closing motion of the two mold tools to perform the molding of the product portion of the material web, whereby the cut is formed during the closing motion of the two mold tools.

21. A method of forming a molded component, in a mold including two mold tools defining a mold cavity therebetween, wherein the method comprises the steps:
  a) providing a material web that comprises a thermoplastic material;
  b) heating the material web to a plastically deformable condition thereof;
  c) while the material web is in the plastically deformable condition, molding a product portion of the material web under pressure into a molded configuration in the mold cavity between the two mold tools;
  d) before and/or during the molding in the step c), forming a cut in a waste portion of the material web at a location offset outwardly away from a perimeter of the product portion of the material web, wherein the cut is a penetrating cut through a thickness of the waste portion of the material web but does not totally separate the product portion from the waste portion, and wherein the material web bordering the cut is pulled away from the cut and toward the mold cavity during and due to the molding in the step c), which reduces stretching and thinning of the product portion of the material web in the mold cavity during the molding; and
  e) cooling the material web in the molded configuration to thereby form the molded component from the product portion of the material web.

* * * * *